United States Patent
Cho et al.

(10) Patent No.: US 7,966,545 B2
(45) Date of Patent: Jun. 21, 2011

(54) APPARATUS AND METHOD FOR CORRECTING ERROR IN A MULTIPLE-INPUT MULTIPLE-OUTPUT COMMUNICATION SYSTEM

(75) Inventors: Dong-Kyoon Cho, Yongin-si (KR); Jong-Yoon Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 997 days.

(21) Appl. No.: 11/829,569

(22) Filed: Jul. 27, 2007

(65) Prior Publication Data
US 2008/0028277 A1    Jan. 31, 2008

(30) Foreign Application Priority Data
Jul. 27, 2006 (KR) .................. 10-2006-0070852

(51) Int. Cl.
*H03M 13/00* (2006.01)
(52) U.S. Cl. .................... 714/755; 375/341
(58) Field of Classification Search .......... 714/752, 714/755, 758, 780; 375/341
See application file for complete search history.

(56) References Cited

U.S. PATENT DOCUMENTS

| 7,095,812 B2 * | 8/2006 | Chan et al. ............ 375/341 |
| 2002/0091973 A1 | 7/2002 | Choi et al. |
| 2003/0112901 A1 | 6/2003 | Gupta |
| 2004/0174939 A1 * | 9/2004 | Wang ..................... 375/316 |
| 2005/0286659 A1 | 12/2005 | Abe et al. |
| 2007/0230609 A1 | 10/2007 | Hwang et al. |

FOREIGN PATENT DOCUMENTS

| KR | 1020040061005 | 7/2004 |
| KR | 1020060048585 | 5/2006 |
| KR | 10-0708475 | 4/2007 |
| KR | 1020070063919 | 6/2007 |

* cited by examiner

*Primary Examiner* — Sam Rizk
(74) *Attorney, Agent, or Firm* — The Farrell Law Firm, P.C.

(57) ABSTRACT

A method for performing Forward Error Correction (FEC) in a Turbo-Bell Labs Layered Space-Time (BLAST) Multiple-Input Multiple-Output (MIMO) communication system. The FEC method includes performing soft decision on a frame received via a plurality of antennas; performing iterative decoding on the soft decision result value a predetermined number of times, and outputting Log Likelihood Ratio (LLR) values for information bits and first parity bits constituting the frame; generating second parity bits by coding information bits calculated from the LLR values, and comparing the first parity bits calculated from the LLR values with the coded second parity bits; and if the first parity bits are identical to the second parity bits, outputting the information bits, determining that there is no error, and if the first parity bits are not identical to the second parity bits, feeding back the LLR values as a-priori information of the soft decision, and returning to the performing of soft decision.

7 Claims, 11 Drawing Sheets

APPARATUS AND METHOD FOR CORRECTING ERROR IN A MULTIPLE-INPUT MULTIPLE-OUTPUT COMMUNICATION SYSTEM

PRIORITY

This application claims priority under 35 U.S.C. §119(a) to a Korean Patent Application filed in the Korean Intellectual Property Office on Jul. 27, 2006 and assigned Serial No. 2006-70852, the disclosure of which is incorporated herein by reference.

BACKGROUND OF THE INVENTION

1. Field of the Invention

The present invention relates generally to an apparatus and method for correcting errors in a Multiple-Input Multiple-Output (MIMO) communication system, and in particular, to an apparatus and method for performing Forward Error Correction (FEC) using a turbo code.

2. Description of the Related Art

A MIMO communication system, in which a transmitter and a receiver each use multiple antennas, can increase channel transmission capacity in proportion to the number of antennas without additional allocation of frequency or transmission power, compared to the single-antenna system.

The most general reception method of the MIMO system includes a Bell Labs Layered Space-Time (BLAST) technique, and in order to approach the theoretical maximum capacity, or Shannon capacity, no error should occur in an interference cancellation process. Actually, however, because errors may inevitably occur, the system should use the BLAST technique, a Coding technique, and an Iteration technique of the two techniques to approach the theoretical maximum capacity, i.e. the Shannon capacity.

Recently, an Iterative Detection and Decoding (IDD) scheme, in which a turbo theory is applied to a MIMO detector, is attracting public attention, and intensive research thereon is being conducted. In MIMO, the Iteration technique is called 'Turbo-BLAST', as it is similar to a turbo decoding scheme.

The Turbo-BLAST scheme, by design, considers a MIMO detector as one coder, and concatenates a channel coder and a MIMO detector. By applying an output of the MIMO detector to a channel decoder and feeding reliability information of bits decoded in the channel decoder back to the MIMO detector, the Turbo-BLAST scheme generates correct coded bit information at the MIMO detector. The MIMO detector has a structure of iterating this process.

A signal received at a reception antenna undergoes Fast Fourier Transform (FFT), and the MIMO detector generates soft decision information of the received transmission signal and transfers the generated soft decision information to the channel decoder. The channel decoder calculates a soft decision value for each bit by using the soft decision information as a-priori information. The soft decision value calculated in the channel decoder is fed back to the MIMO detector, and used as a-priori information of the MIMO detector. By iterating this process, a receiver can increase reliability of received bits, thereby showing performance approaching the Shannon capacity. An increase in the iteration of the MIMO detector and channel decoder operations contributes to an increase of the system performance, but causes an increase in the hardware complexity and time delay.

Generally, because stopping Turbo-BLAST is similar to stopping turbo decoding, a turbo decoding stopping technique will first be described herein.

In the turbo decoding process, an iterative decoding stopping criterion for iterative decoding should satisfy Condition 1 below.

Condition 1: iterative decoding stops when $M(i)>T(i)$ or $M(i)=T(i)$.

In Condition 1, $M(i)$ denotes a measure indicating turbo decoding frame performance measured for decoding stopping in an $i^{th}$ iterative decoding process, and $T(i)$ denotes a threshold for a measure, based on which it is possible to determine that there is no error for a frame decoded in an $i^{th}$ iterative decoding process. In each decoding process, the measure $M(i)$ is compared with a preset threshold, or the threshold $T(i)$ determined in the iterative decoding process, and as a result of the comparison, if Condition 1 is satisfied, decoding is stopped at the corresponding iterative decoding. In the following description, a process of performing decoding sequentially through two Soft-Input Soft-Output (SISO) decoders constituting the turbo decoder, i.e. through a first SISO decoder and a second SISO decoder, is defined as 'one-iteration decoding'. That is, a process of performing decoding through any one of the first SISO decoder and the second SISO decoder is 0.5-iteration decoding.

A description will now be made of schemes based on the stopping criteria for the iterative decoding, proposed up to now.

(1) Genie-aided Stopping Criterion Scheme

In the Genie-aided Stopping Criterion scheme, Genie, a kind of a simulator, compares an information codeword decoded in an arbitrary SISO decoder with transmitted information while observing an iterative decoding process of the turbo decoder, and stops decoding if no error is detected. Because this decoding stopping scheme is available only with experimental simulation, its actual realization is impossible. Therefore, the Genie-aided Stopping Criterion scheme is applied only as a criterion that schemes using other stopping criteria should ideally realize.

The Genie-aided Stopping Criterion scheme can be expressed as Condition 2.

Condition 2: iterative decoding stops when $M(i)=T(i)$.

In Condition 2, however, a measure $M(i)$ indicates the number of different bits between a decoded frame detected in a SISO decoder in an $i^{th}$ iterative decoding process and a transmitted frame, and a threshold $T(i)$ is 0.

(2) CRC Check Stopping Criterion Scheme

Generally, in a Code Division Multiple Access (CDMA) mobile communication system, a frame input to a turbo coder includes a Cyclic Redundancy Check (CRC) bit(s) for error detection so that the turbo decoder can decode it and then report error occurrence/non-occurrence for the corresponding frame to an upper layer. A capability of detecting error occurrence/non-occurrence for the frame with the CRC bit can also be used as a stopping criterion of the turbo decoder. That is, for an arbitrary frame input to the turbo decoder, the scheme detects an error through a CRC process in an iterative decoding process, and stops the decoding process if no error is detected.

The CRC stopping criterion scheme can be expressed as Condition 3.

Condition 3: iterative decoding stops when $M(i)=T(i)$.

In Condition 3, however, a measure $M(i)$ indicates a CRC check result on a decoded frame detected in a SISO decoder in an $i^{th}$ iterative decoding process, and a threshold $T(i)$ is 0.

However, the CRC stopping criterion scheme suffers from overhead caused by a CRC bit at every frame, and when there is no CRC bit in a frame input by means of frame division in a decoding process, it is not possible to decode the corresponding frame using the CRC stopping criterion scheme. For example, in a Universal Mobile Telecommunication System (UMTS)-based High Speed Downlink Packet Access (HSDPA) communication system in which there are more than two code units, it is general that when the turbo decoding is performed on an arbitrary code unit, there is not always a CRC bit to be used for the CRC stopping criterion scheme.

(3) Approximated Cross Entropy Stopping Criterion Scheme

Generally, a Cross Entropy (CE) between two probability distributions can be used as a measure indicating probabilistic closeness between the two probability distributions. Hagenauer has defined and simplified a cross entropy between probability distributions of outputs of two SISO decoders using reliability, or Log Likelihood Ratio (LLR), and has defined it as a measure to be applied to a stopping criterion of the turbo decoder. This scheme stops decoding if the measure decreases step by step and thus, it is determined that a probabilistic closeness output from the SISO decoder is very high.

The Approximated Cross Entropy Stopping Criterion scheme can be expressed as Condition 4.

Condition 4: iterative decoding stops when M(i)<T(i).

Condition 4, however, M(i) indicates a measure $$M(i) = \sum_k \frac{|L_1^{(i)}(u_k) - L_2^{(i-1)}(u_k)|^2}{\exp(|L_2^{(i-1)}(u_k)|)}$$

in a first SISO decoder, or a measure $$M(i) = \sum_k \frac{|L_2^{(i)}(u_k) - L_1^{(i)}(u_k)|^2}{\exp(|L_1^{(i)}(u_k)|)}$$

in a second SISO decoder, and a threshold T(i) is $T(10^{-2} \sim 10^{-4})$.

However, the Approximated Cross Entropy Stopping Criterion scheme should perform an exp(*) operation separately for each SISO decoder to set a criterion in each iterative decoding process, and the hardware complexity increases due to the exp(*) operation.

(4) Hard Decision-aided (HDA) Stopping Criterion Scheme

The Hard Decision-Aided Stopping Criterion scheme compares output information codewords of two SISO decoders in an arbitrary iterative decoding process, and stops the protection when there is no difference between the information codewords output from the two SISO decoders as a result of the comparison.

The Hard Decision-Aided Stopping Criterion scheme can be expressed as Condition 5.

Condition 5: iterative decoding stops when M(i)=T(i).

In Condition 5, however, a measure M(i) indicates the number of different bits between a decoded information frame detected in an $i^{th}$ iterative decoding process and a decoded information frame detected in an $(i-0.5)^{th}$ iterative decoding process, and a threshold T(i) is '0'.

Because the Hard Decision-Aided Stopping Criterion scheme should compare an information codeword output of a previous SISO decoder with an information codeword output of a current SISO decoder, it should include an additional memory for storing an information codeword of the previous SISO decoder during hardware implementation.

(5) Minimum Absolute LLR (MAL) Stopping Criterion Scheme

The Minimum Absolute LLR Stopping Criterion scheme considers an approximation process of Equation (1) at a measure applied in the approximated cross entropy stopping criterion proposed by Hagenauer.

$$\sum_k \frac{|Le_v^{(i)}(\hat{u}_k)|^2}{\exp(|L_v^{(i)}(\hat{u}_k)|)} \approx K \cdot \exp\left(-\min_k(|L_v^{(i)}(\hat{u}_k)|)\right) \quad (1)$$

Using the approximation process of Equation (1), a Minimum Absolute LLR Stopping Criterion scheme of Condition 6 has been proposed.

Condition 6: iterative decoding stops when $M(i) > T_1(i)$ and $M(i) > T_2(i)$.

In Condition 6, a measure M(i) indicates $$M(i) = \min_k(|L_v^{(i)}(\hat{u}_k)|)$$

at a $v^{th}$ SISO decoder in an $i^{th}$ iterative decoding process, a first threshold $T_1(i)$ is $$T_1(i) = \min_{j<i} M(j) + T_f,$$

and a second threshold $T_2(i)$ is $T_2(i) = M_1 + T_d$.

As a result, the Minimum Absolute LLR Stopping Criterion scheme sets an LLR whose absolute value is minimum, among output LLR information of an arbitrary SISO decoder, as a measure of a stopping criterion, and uses the set measure as a current threshold in a previous iterative decoding process. Although the foregoing Approximated Cross Entropy Stopping Criterion scheme and the Hard Decision-Aided Stopping Criterion scheme both have used the information detected by two SISO decoders for the stopping criterion, the Minimum Absolute LLR Stopping Criterion scheme can stop iterative decoding only with the information detectable by the current SISO decoder. However, because the Minimum Absolute LLR Stopping Criterion scheme stops iterative decoding only with the information detected by the current SISO decoder other than the two SISO decoders, it may suffer from performance degradation in terms of a Frame Error Rate (FER). In order to minimize the possible FER performance degradation, the Minimum Absolute LLR Stopping Criterion scheme detects $T_f$ and $T_d$ considered when setting the first threshold $T_1(i)$ and the second threshold $T_2(i)$, using the experimental simulation results.

In order to reduce frame size or performance independency for a Signal-to-Noise Ratio (SNR), the Minimum Absolute LLR Stopping Criterion scheme can adaptively apply the thresholds. In this case where the thresholds are adaptively applied, the scheme can prevent the FER performance degradation, but may suffer from an increase in the average number of iterations.

(6) Sign Difference Ratio (SDR) Stopping Criterion Scheme

The foregoing Hard Decision-Aided Stopping Criterion scheme should compare information codewords output from a first SISO decoder and a second SISO decoder of the turbo decoder at every 0.5-iteration decoding process. Thus, this scheme should previously store an output information codeword of a previous SISO decoder at a decoding end time of the current SISO decoder. Therefore, application of the Hard Decision-Aided Stopping Criterion scheme needs additional hardware implementation of a memory. A scheme proposed for the additional hardware implementation of a memory is the Sign Difference Ratio Stopping Criterion scheme. This scheme, instead of comparing an output information codeword of the current SISO decoder with an output information codeword of the previous SISO decoder, compares all signs of input a-priori information and output extrinsic information for the current frame of one SISO decoder, and stops decoding according to the number of bits having different signs.

The Sign Difference Ratio Stopping Criterion scheme can be expressed as Condition 7.

Condition 7: iterative decoding stops when M(i)<T(i).

In Condition 7, a measure M(i) indicates the number of different signs between input a-priori information and output extrinsic information for an information frame decoded by a SISO decoder in an $i^{th}$ iterative decoding process, and threshold T(i) is p.

In the Sign Difference Ratio Stopping Criterion scheme, because the input a-priori information and the output extrinsic information are converged slowly compared to the LLR information, the average number of iterations in the Sign Difference Ratio Stopping Criterion scheme with p=0 is greater than the average number of iterations in the Hard Decision-Aided Stopping Criterion scheme. If the value p used as a threshold is increased to solve the problem that the Sign Difference Ratio Stopping Criterion scheme is greater than the Hard Decision-Aided Stopping Criterion scheme in the average number of iterations, the Sign Difference Ratio Stopping Criterion scheme can reduce the average number of iterations, but may suffer from FER performance degradation.

As described above, most conventional stopping techniques are low in reliability, so the highest-reliability CRC technique for iterative decoding stopping is generally used. However, in a Wireless Broadband (WiBro) system, one burst includes several coding blocks but the CRC technique is achieved in units of bursts. Therefore, the WiBro system cannot use the CRC technique for each coding block.

SUMMARY OF THE INVENTION

An aspect of the present invention is to address at least the problems above and/or disadvantages and to provide at least the advantages described below. Accordingly, an aspect of the present invention is to provide an error correction apparatus and method for efficiently stopping iterative decoding in a MIMO communication system.

Another aspect of the present invention is to provide an error correction apparatus and method for efficiently stopping iterative decoding without greatly increasing complexity and frequency band of a receiver in a communication system that cannot use a CRC technique.

According to one aspect of the present invention, there is provided a method for performing Forward Error Correction (FEC) in a Multiple-Input Multiple-Output (MIMO) communication system using a turbo-Bell Labs Layered Space-Time (BLAST) scheme. The FEC method includes performing soft decision on a frame received via a plurality of antennas; performing iterative decoding on the soft decision result value a predetermined number of times, and outputting Log Likelihood Ratio (LLR) values for information bits and first parity bits constituting the frame; generating second parity bits by coding information bits calculated from the LLR values, and comparing the first parity bits calculated from the LLR values with the coded second parity bits; and if the first parity bits are identical to the second parity bits, outputting the information bits, determining that there is no error, and if the first parity bits are not identical to the second parity bits, feeding back the LLR values as a-priori information of the soft decision, and returning to the performing of soft decision.

According to another aspect of the present invention, there is provided an apparatus for performing Forward Error Correction (FEC) in a Multiple-Input Multiple-Output (MIMO) communication system using a turbo-Bell Labs Layered Space-Time (BLAST) scheme. The FEC apparatus includes a detector for performing soft decision on a frame received via a plurality of antennas; a decoder for performing iterative decoding on the soft decision result value a predetermined number of times, and outputting Log Likelihood Ratio (LLR) values for information bits and first parity bits constituting the frame; and a coder for generating second parity bits by coding information bits calculated from the LLR values, comparing the first parity bits calculated from the LLR values with the coded second parity bits, determining occurrence/non-occurrence of an error according to the comparison result, and outputting the information bits or feeding back the LLR values as a-priori information of the soft decision according to the determination result.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention considers a Turbo-BLAST MIMO system having N transmission antennas and M reception antennas.

Figure 1:
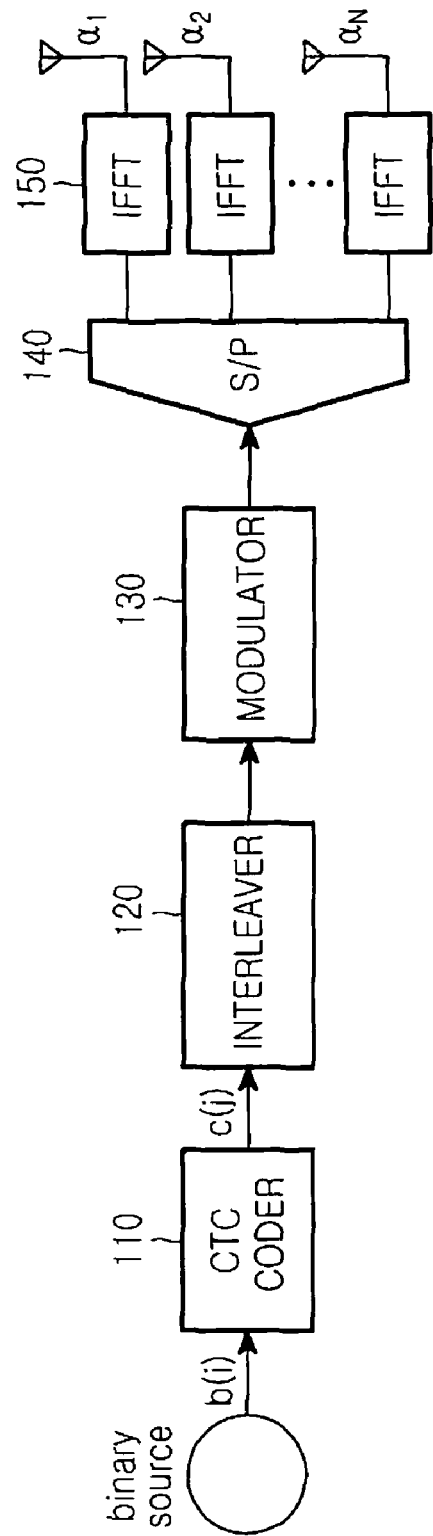
FIG. 1 is a diagram illustrating a structure of a transmitter for a MIMO system to which the present invention is applicable.

FIG. 1 is a diagram illustrating a structure of a transmitter for a MIMO system to which the present invention is applicable.

In FIG. 1, b(i) indicates information bits, where $i \in \{1, \ldots, L\}$ and L denotes the number of information bits in a frame. The bits c(j) coded in a Convolutional Turbo Code (CTC) coder 110, where $j \in \{1, \ldots, L/R\}$ and R denotes a code rate, are interleaved in an interleaver 120, modulated in a modulator 130, and divided into sub-streams in a Serial-to-Parallel converter (S/P) 140. Thereafter, the sub-streams are subject to Inverse Fast Fourier Transform (IFFT) in an IFFT unit 150, and then transmitted over their associated MIMO channels.

Figure 2:
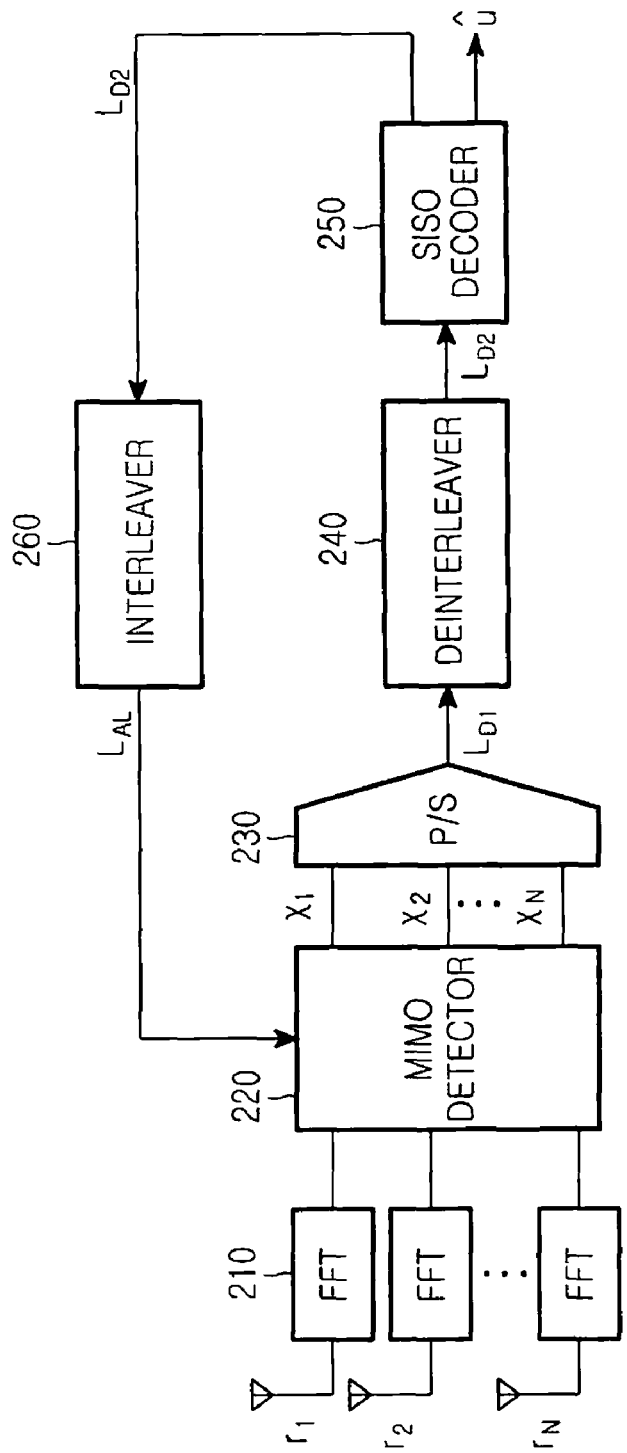
FIG. 2 is a diagram illustrating a structure of a receiver for a MIMO system to which the present invention is applicable.

FIG. 2 is a diagram illustrating a structure of a receiver for a MIMO system to which the present invention is applicable.

In FIG. 2, signals received via reception antennas are converted into frequency-band signals through an FFT unit 210, and a MIMO detector 220 detects the received transmission signals. A Parallel-to-Serial converter (P/S) 230 converts the parallel signals detected by the MIMO detector 220 into a serial signal. A deinterleaver 240 performs deinterleaving on the output signal of the P/S 230, and a SISO decoder 250 calculates a soft value for the received signals. An interleaver 260 interleaves the soft value output from the SISO decoder 250, and delivers it to the MIMO detector 220. The MIMO detector 220 re-detects the received transmission signals by using the soft value output from the SISO decoder 250 as a-priori information.

In FIGS. 1 and 2, when 'a' is defined as a vector of an $N^{th}$ row and a $1^{st}$ column selected in a constellation C (for example, $M_c=2$ for Quadrature Phase Shift Keying (QPSK) composed of complex numbers having $2M_c$ points, and 'r' is defined as a vector of an $M^{th}$ row and a $1^{st}$ column for a received signal, a relational expression can be given as Equation (2).

$$r = Ha + v \qquad (2)$$

If it is assumed herein that a channel is in a frequency non-selective fading environment, 'H' is a complex matrix and 'v' is an independent complex Gaussian noise with a mean 0 and a per-dimension variance $N_0/2$. Here a vector $a=[a_1, \ldots, a_N]^T$ observes a component power limit $E\|a_n\|^2 = E_s/N$, and this is made such that the total power of transmission signals becomes $E_s$.

An embodiment of the present invention provides a new stopping technique that uses outputs of the SISO decoder without greatly increasing complexity and frequency band of the MIMO detector shown in FIG. 2.

Figure 3:
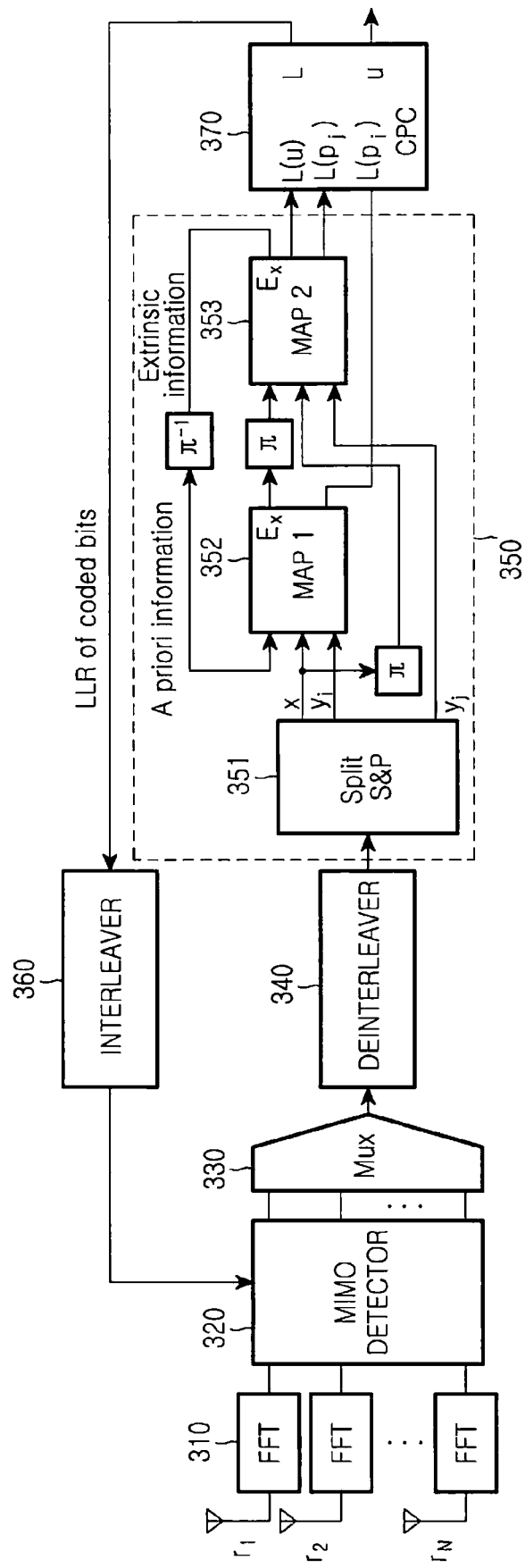
FIG. 3 is a diagram illustrating a structure of a receiver for a MIMO system according to an embodiment of the present invention.

FIG. 3 is a diagram illustrating a structure of a receiver for a MIMO system according to an embodiment of the present invention.

Referring to FIG. 3, the receiver for the MIMO system according to an embodiment of the present invention includes an FFT unit 310, a MIMO detector 320, a deinterleaver 340, a SISO decoder 350, an interleaver 360 and a Combined Parity Check (CPC) unit 370. In FIG. 3, a Minimum Mean Square Error (MMSE) detector, a Maximum A-Posteriori (MAP) detector, or an equalizer can be used as the MIMO detector 320.

This receiver is equal in structure to the receiver of FIG. 2 except that the CPC unit 370 is connected to an output terminal of the SISO decoder 350, so a repeated description will be omitted, and a description of an operation of the receiver according to an embodiment of the present invention will be made herein mainly as to the SISO decoder 350 and the CPC unit 370.

In an $i^{th}$ inner iteration of the SISO decoder 350, if $L_j^{(i)}(\hat{u}_k)$ and $L_{je}^{(i)}(\hat{u}_k)$ are defined as an LLR and extrinsic information of estimated information bits $\hat{u}_k$ separated by a Maximum A-posteriori Probability (MAP) decoder j, respectively, and $L_j^{(i)}(\hat{p}_{jk})$ and $L_{je}^{(i)}(\hat{p}_{jk})$ are defined as LLR and extrinsic information of parity bits $\hat{p}_{jk}$ separated and estimated by a MAP decoder j (where j=1,2), respectively, then the above values are expressed as Equation (3).

$$L_j^{(i)}(\hat{u}_k) = L_{ja}^{(i)}(u_k) + L_c x_k + L_{je}^{(i)}(\hat{u}_k) \qquad (3)$$

where $L_{ja}^{(i)}(u_k)$ denotes a-priori information of $u_k$ and $L_c$ denotes a channel value.

In this manner, $L_j^{(i)}(\hat{p}_{jk})$ is defined as Equation (4).

$$L_j^{(i)}(\hat{p}_{jk}) = L_c y_{jk}^* + L_{je}^{(i)}(\hat{p}_{jk}) \qquad (4)$$

In addition, when the number of bit errors in one frame is defined as $N_{ber}$ and a sign difference between re-coded parity bits determined from decoded parity bits and decoded information bits is defined as $D_p$, the following observations can be obtained through numerous simulations.

(1) For a bad frame which is hard to decode, both $E[|L_{ja}^{(i)}(u_k)|]$ and $E[|L_{je}^{(i)}(\hat{u}_k)|]$ do not greatly increase, and remain at around $E[|L_c x_k|]$ or at a lower value.

(2) For a good frame, as i increases, both $E[|L_{ja}^{(i)}(u_k)|]$ and $E[|L_{je}^{(i)}(\hat{u}_k)|]$ increase. When $N_{ber}$ approaches 0, $E[|L_{ja}^{(i)}(u_k)|]$ and $E[|L_{je}^{(i)}(\hat{u}_k)|]$ have a large value which is about 5 to 10 times $E[|L_c x_k|]$. As a result, $L_i(\hat{u}_k)$ is determined depending on $L_{ja}^{(i)}(u_k) + L_{je}^{(i)}(\hat{u}_k)$.

(3) For a good frame, as i increases, $E[|L_{je}^{(i)}(\hat{p}_{jk})|]$ increases. When $N_{ber}$ approaches 0, $E[|L_{je}^{(i)}(\hat{p}_{jk})|]$ has a value which is considerably larger than $E[|L_c y_{jk}|]$. As a result, $L_j^{(i)}(\hat{p}_{jk})$ is determined depending on $L_{je}^{(i)}(\hat{p}_{jk})$.

(4) For a bad frame, $E[|L_{je}^{(i)}(\hat{p}_{jk})|]$ does not greatly increases, and remains at around $E[|L_c y_{jk}|]$ or at a lower value.

(5) For a good frame, when i increases, $D_p$ also approaches 0, like $N_{ber}$. Generally, $N_{ber}$ and $D_p$ reach 0 almost at the same time.

(6) For a bad frame, when i increases, $D_p$ continues to remain at a high value. Here, E[X] denotes an expected value of a probability parameter X.

Observation (6) can be explained from Observations (2) and (4). For a bad frame, $L_j^{(i)}(\hat{p}_{jk})$ and $L_j^{(i)}(\hat{u}_k)$ are greatly affected by $L_c y_{jk}$ and $L_c x_k$, respectively. In addition, noises of $y_{jk}$ and $x_k$ are independent of each other. Therefore, a correlation between $L_j^{(i)}(\hat{p}_{jk})$ and $L_j^{(i)}(\hat{u}_k)$ for a bad frame is lower than a correlation for a good frame. That is, even though $\hat{u}_k$ cannot be correctly determined due to noises, $\hat{p}_{jk}$ can be correctly determined without depending on an error of $\hat{u}_k$. This is because it is optimal in that the MAP decoder minimizes an error rate of the coded bits.

Observation (5), and Observation (6) derived from a difference between decoded parity bits and re-coded parity bits show that $D_p$ is an indicator capable of stopping iteration without performance degradation.

Therefore, an embodiment of the present invention provides a CPC technique based on the foregoing observations.

Figure 4A:
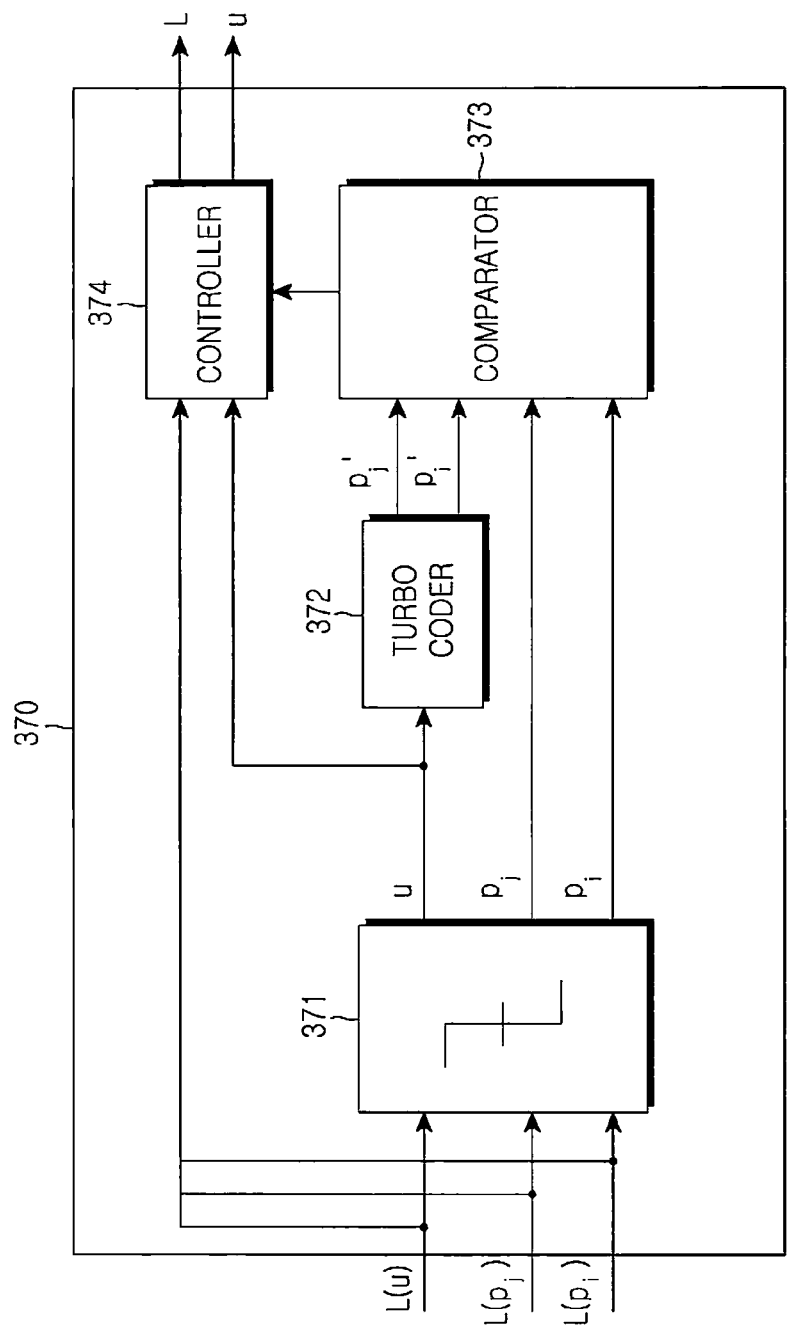
FIG. 4A is a diagram illustrating a structure of a CPC unit according to an embodiment of the present invention.

FIG. 4A is a diagram illustrating a structure of a CPC unit 370 according to an embodiment of the present invention.

Referring to FIGS. 3 and 4A, a hard decision unit 371 performs a hard decision on an LLR value L(u) of information bits output from a SISO decoder 350, an LLR value L($p_i$) of parity bits output from a MAP1 352, and an LLR value L($p_j$) of parity bits output from a MAP2 353, and outputs information bits u, parity bits $p_i$ and parity bits $p_j$ as the result values. A turbo coder 372 re-codes the information bits u and outputs parity bits $p_i$' and parity bits $p_j$'. A comparator 373 compares the parity bits $p_i$' and the parity bits $p_j$' output from the turbo coder 372, with the parity bits $p_i$ and the parity bits $p_j$ output from the hard decision unit 371, and outputs the resulting control signal to a controller 374. That is, the comparator 373 outputs to the controller 374 a control signal based on which if the parity bits are equal to each other, the controller 374 outputs the information bits u, and if the parity bits are different from each other, the controller 374 outputs an LLR value L. The controller 374 receives the LLR value L(u) of information bits output from the SISO decoder 350, the LLR value L($p_i$) of parity bits output from the MAP1 352, the LLR value L($p_j$) of parity bits output from the MAP2 353, and the hard-decided information bits u, and selectively outputs the LLR value L or the information bits u according to the control signal of the comparator 373. When the LLR value L is output, this value is fed back to the MIMO detector 320.

Figure 4B:
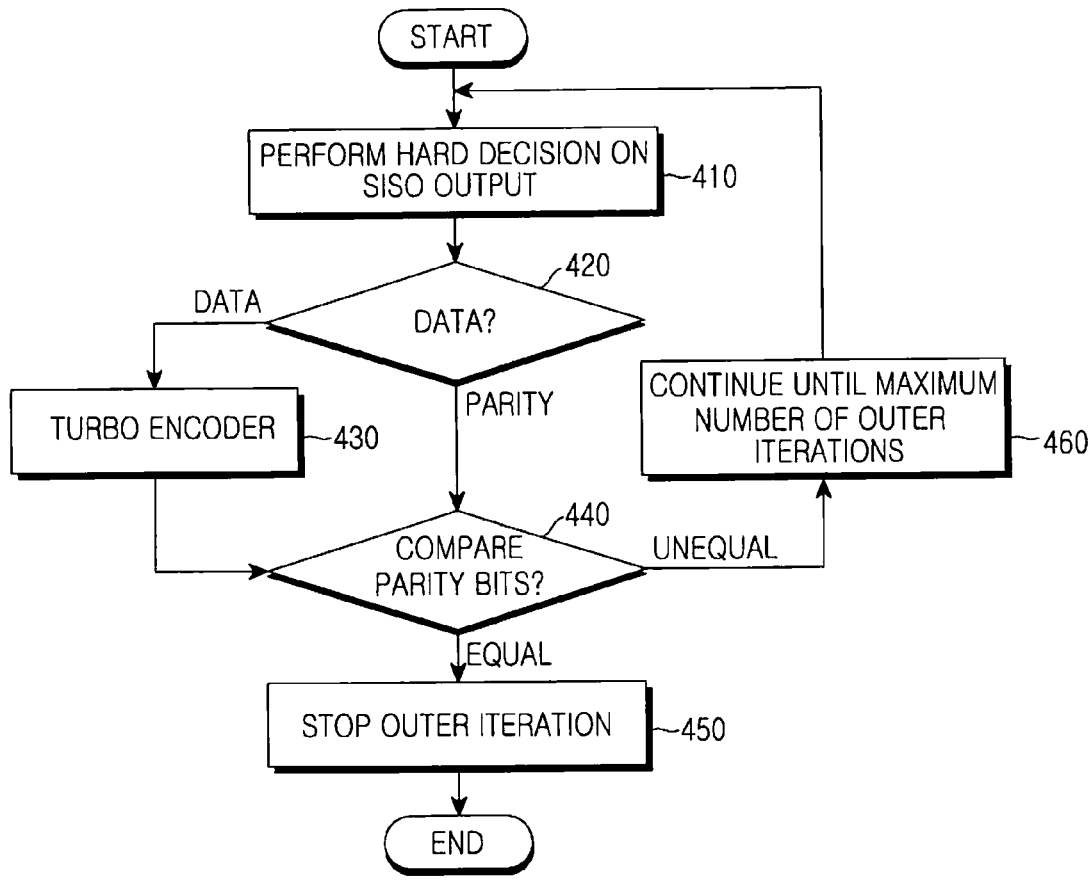
FIG. 4B is a flowchart illustrating a CPC technique according to an embodiment of the present invention.

FIG. 4B is a flowchart illustrating a CPC technique according to an embodiment of the present invention.

Referring to FIG. 4B, in step 410, a CPC unit 370 performs a hard decision on an output value of a SISO decoder 350. In step 420, the CPC unit 370 checks the hard decision result value. If the hard decision result value indicates data, or information bits, the CPC unit 370 proceeds to step 430 where it inputs the hard-decided information bits to a turbo coder 372. However, if the hard decision result value indicates parity bits, the CPC unit 370 proceeds to step 440 where it compares the hard-decided parity bits with the parity bits generated by re-coding the information bits by the turbo coder 372. If the compared bits are equal to each other, the CPC unit 370 proceeds to step 450 where it stops outer iteration. However, if the compared bits are not equal to each other, the CPC unit 370 proceeds to step 460 where it repeats the above process until the number of iterations reaches the maximum number of outer iterations.

Figure 5:
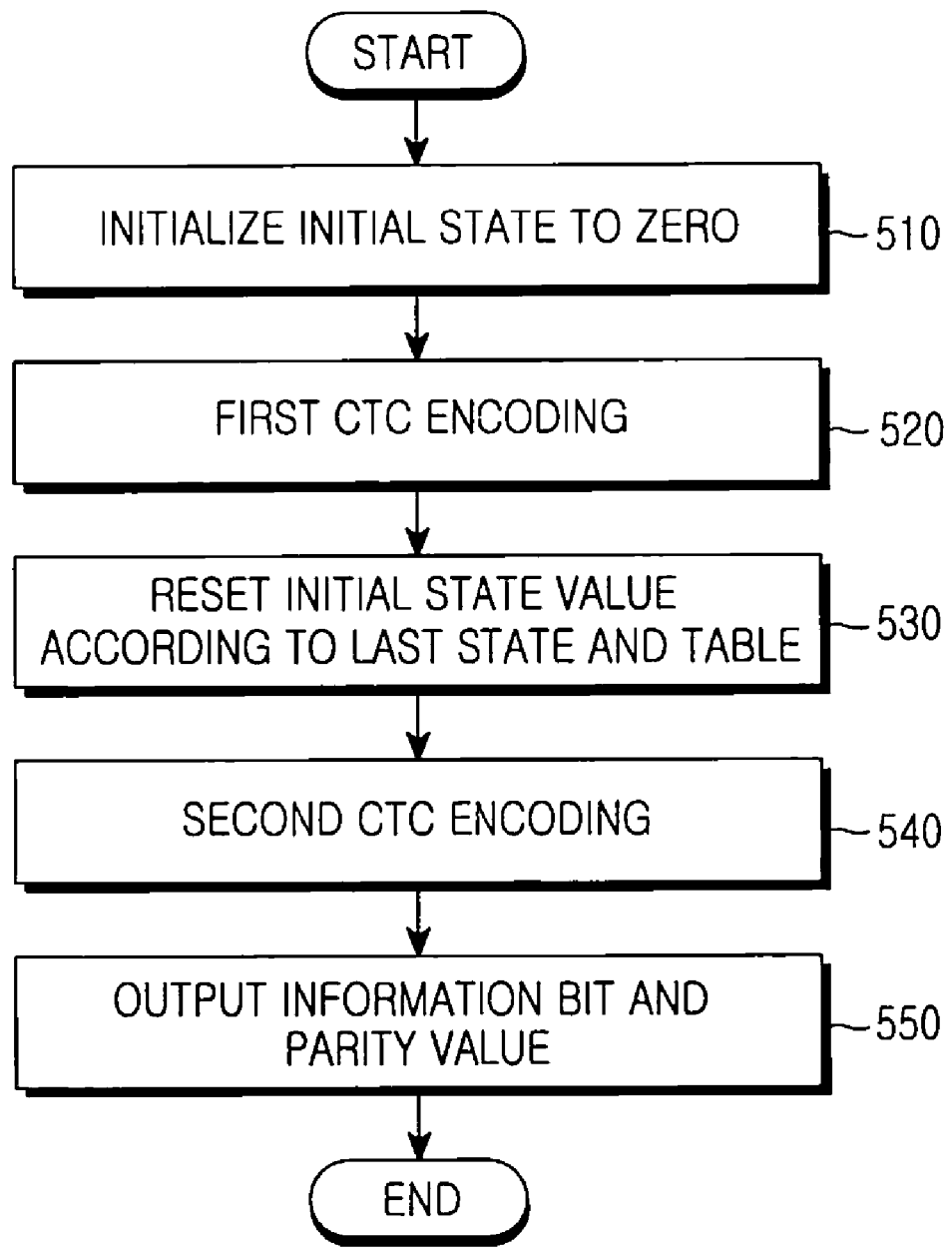
FIG. 5 is a flowchart illustrating an operation of a turbo coder.

FIG. 5 is a flowchart illustrating an operation of a turbo coder.

Referring to FIG. 5, a duobinary CTC decoder used for, for example, a WiBro system, performs decoding such that an initial state and a last state are equal to each other, through two decoding processes 520 and 540. This structure has no loss of tail bits, which may occur when zero termination is used, and facilitates simple processing of the frame after system decoding.

The zero termination method generally used for convolutional codes and turbo codes solves the problem that the performance degrades due to a decrease in reliability of end information of a trellis. However, this method cannot avoid a loss of the code rate. Based on the characteristic that the initial and last states of a tail-biting code are equal to each other, it is possible to obtain high decoding performance with no loss of the code rate.

Figure 6:
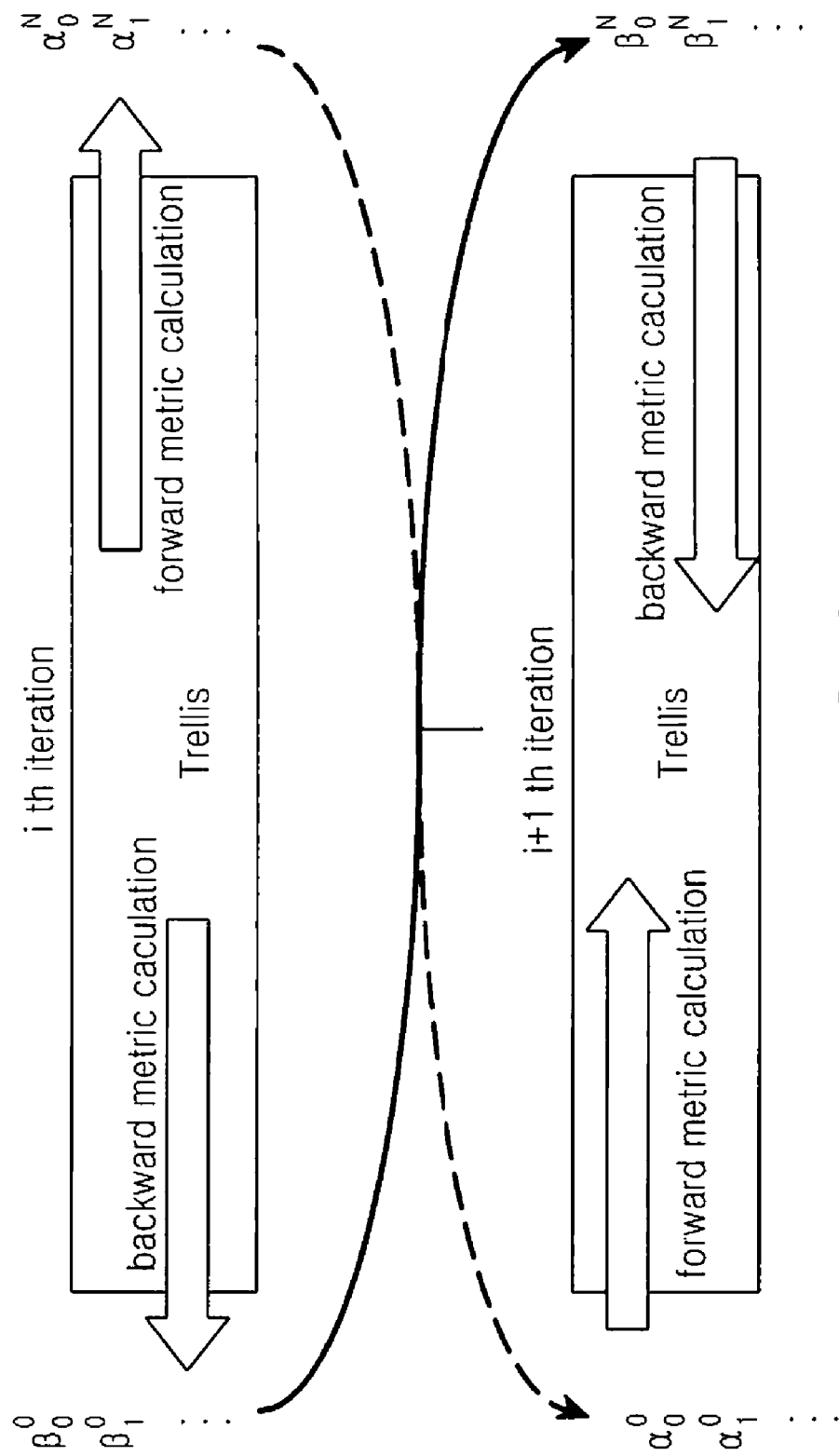
FIG. 6 is a diagram illustrating a tail-biting decoding method used for a CTC decoder.

FIG. 6 is a diagram illustrating a tail-biting decoding method used for a CTC decoder.

Referring to FIG. 6, CTC decoding uses a MAP algorithm, and the MAP algorithm provides LLRs of a A-Posteriori Probability (APP) that each information bit will be '1', and of an APP that each information bit will be '0'. The results are given as Equation (5).

$$L(\hat{d}_k) = \log \left[ \frac{\sum_m \alpha_k^m \delta_k^{1,m} \beta_{k+1}^{f(1,m)}}{\sum_m \alpha_k^m \delta_k^{0,m} \beta_{k+1}^{f(0,m)}} \right] \quad (5)$$

Probability functions in Equation (5) are defined as follows.

$\delta_k^{i,m} = P(d_k=i, S_k=m|R_1^N)$ $\alpha_k^m = P(R_1^{k-1}|S_k=m)$ $\beta_{k+1}^{f(i,m)} = P(R_{k+1}^N|S_{k+1}=f(i,m))$ where f(i,m) denotes a next state when an input i and a state m are given.

As shown in FIG. 6, a forward metric probability value α is for forward metric calculation, and a backward metric probability value β is for backward metric calculation. That is, in order to calculate a $\alpha^1$ vector, there is a need for a value of $\alpha^0$. Generally, because a turbo code starts from a zero state and terminates at a zero state, a first value of a $\alpha^0$ vector is set to the maximum value and the remaining values are all set to 0. However, because a CTC code is set such that a start state and a last state of a frame are always equal to each other, a value $\alpha^N$ of a first iteration is used as a value $\alpha^0$ of a second iteration from the second iteration. Even for the β value, the last β matrix vector calculated at a previous iteration is used as an initial value at the current iteration from the second iteration using the same scheme.

Due to this tail-biting decoding characteristic, the $\beta^0$ vector value, after CTC decoding, is converged to an initial state value. Because the β value is for backward metric calculation as described above, if an initial value is set to a $\beta^N$ vector, a $\beta^{N-1}$ vector can be calculated from this value. In the same manner, up to the $\beta^0$ vector can be calculated. That is, if there is no error caused by a channel, a state with the greatest value in the $\beta^0$ vector is identical to an initial state. Therefore, because the initial state cannot be estimated if the state with the greatest value is selected from the $\beta^0$ vector after an end of decoding, it is possible to omit a CTC turbo coding process for acquiring information on the initial state and to perform the CTC turbo coding process only once.

Therefore, in the CTC stopping technique, because a CTC coder has information on an initial state value, the CTC coder can enable CTC coding with only one coding with use of the $\beta^0$ vector value, thereby doubling the coding processing speed. This stopping technique will be referred to herein as an Enhanced-CPC (E-CPC) stopping technique.

Figure 7A:
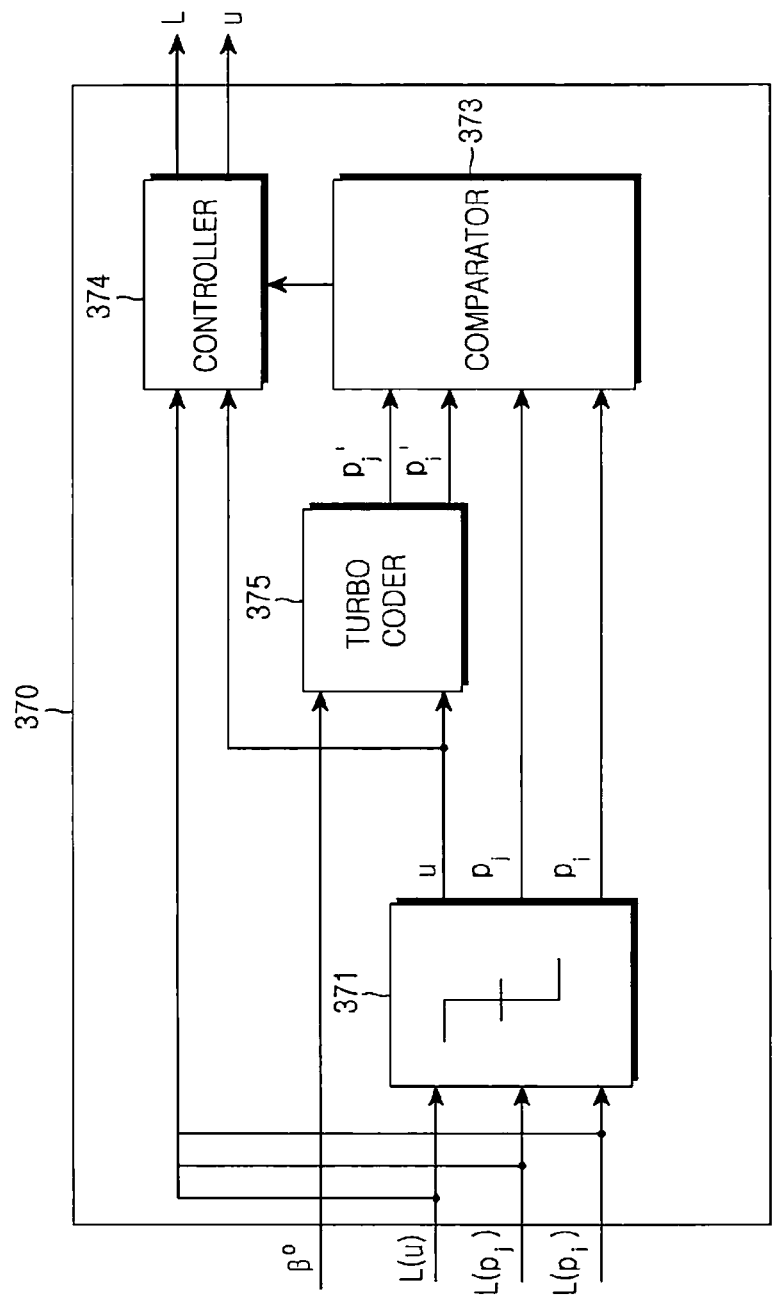
FIG. 7A is a diagram illustrating a structure of a CPC unit that performs an E-CPC stopping technique according to an embodiment of the present invention.

FIG. 7A is a diagram illustrating a structure of a CPC unit that performs an E-CPC stopping technique according to an embodiment of the present invention.

Referring to FIGS. 3 and 7A, a hard decision unit 371 performs a hard decision on an LLR value L(u) of information bits output from a SISO decoder 350, an LLR value L($p_i$) of parity bits output from a MAP1 352, and an LLR value L($p_j$) of parity bits output from a MAP2 353, and outputs information bits u, parity bits $p_i$ and parity bits $p_j$ as the result values. A turbo coder 375 re-codes the information bits u and outputs parity bits $p_i$' and parity bits $p_j$'. In addition, the turbo coder 375 receives a $\beta^0$ vector value from the SISO decoder 350 and sets an initial state value using the received value, thereby performing coding only once. A comparator 373 compares the parity bits $p_i'$ and the parity bits $p_j'$ output from the turbo coder 375, with the parity bits $p_i$ and the parity bits $p_j$ output from the hard decision unit 371, and outputs the resulting control signal to a controller 374. That is, the comparator 373 outputs to the controller 374 a control signal based on which if the parity bits are equal to each other, the controller 374 outputs the information bits u, but if the parity bits are different from each other, the controller 374 outputs an LLR value L. The controller 374 receives the LLR value L(u) of information bits output from the SISO decoder 350, the LLR value $L(p_i)$ of parity bits output from the MAP1 352, the LLR value $L(p_j)$ of parity bits output from the MAP2 353, and the hard-decided information bits u, and selectively outputs the LLR value L or the information bits u according to the control signal of the comparator 373. When the LLR value L is output, this value is fed back to the MIMO detector 320.

Figure 7B:
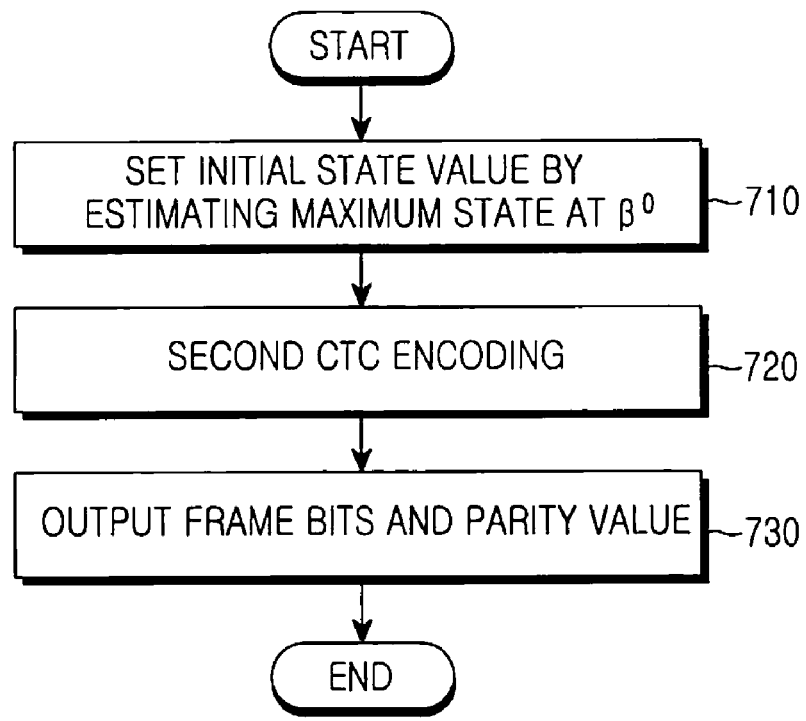
FIG. 7B is a flowchart illustrating an operation of a turbo coder for an E-CPC stopping technique according to an embodiment of the present invention.

FIG. 7B is a flowchart illustrating an operation of a turbo coder for an E-CPC stopping technique according to an embodiment of the present invention.

Referring to FIG. 7B, in step 710, a turbo coder 375 sets an initial state value using a $\beta^0$ vector input from a SISO decoder 350. In step 720, the turbo coder 375 re-codes the information bits obtained by performing hard decision on the L(u) output from the SISO decoder 350, using the set initial state value. In step 730, the turbo coder 375 outputs the information bits, and the parity bits obtained by re-coding the information bits.

Although the foregoing CPC technique and E-CPC technique according to an embodiment of the present invention can be used for the interior of the turbo decoder, these techniques can be more complex than the existing stopping techniques because they should calculate soft values for the unnecessary parity. Therefore, it is efficient to use the techniques for reducing the total number of outer iterations of Turbo-BLAST. In addition, because termination of outer iteration means that the frame has no error, inner iteration is no longer needed. That is, before the outer iteration terminates, inner iteration of turbo decoding is performed up to the maximum value 1. Therefore, in order to terminate the outer iteration, it is efficient for the turbo processing system to fix the number of inner iterations of turbo decoding to 1, and perform the stopping technique according to an embodiment of the present invention just after the last inner iteration.

Figure 8:
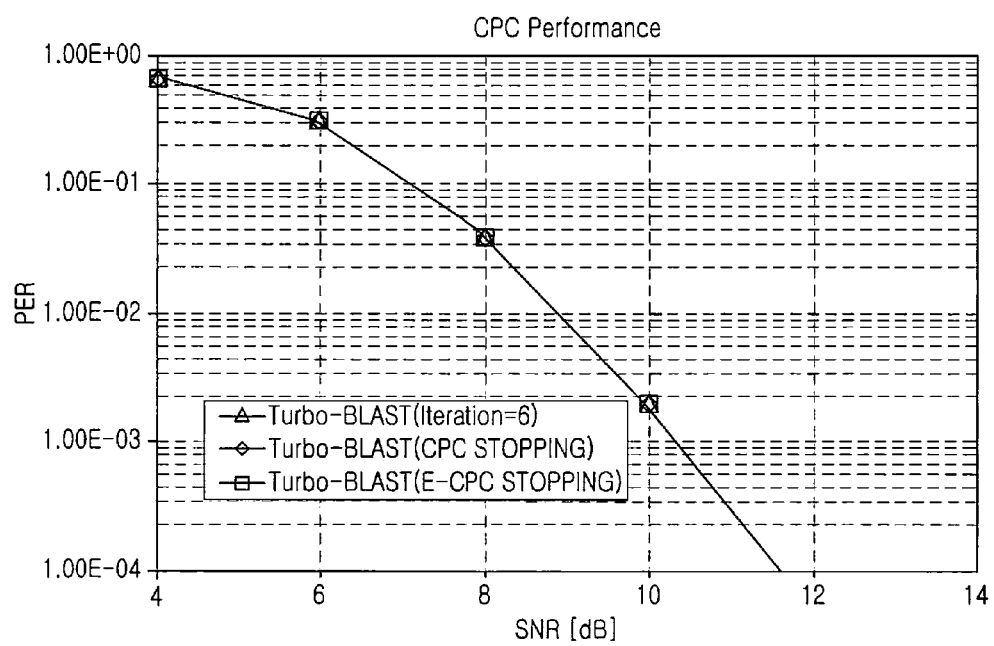
FIGS. 8 and 9 are diagrams illustrating CPC performance in a Turbo-BLAST MIMO system environment that uses a MMSE detector as a MIMO detector for a Veh.A 60 km/h channel, Quadrature Phase Shift Keying (QPSK), and a code rate ½ in a WiBro system.
Figure 9:
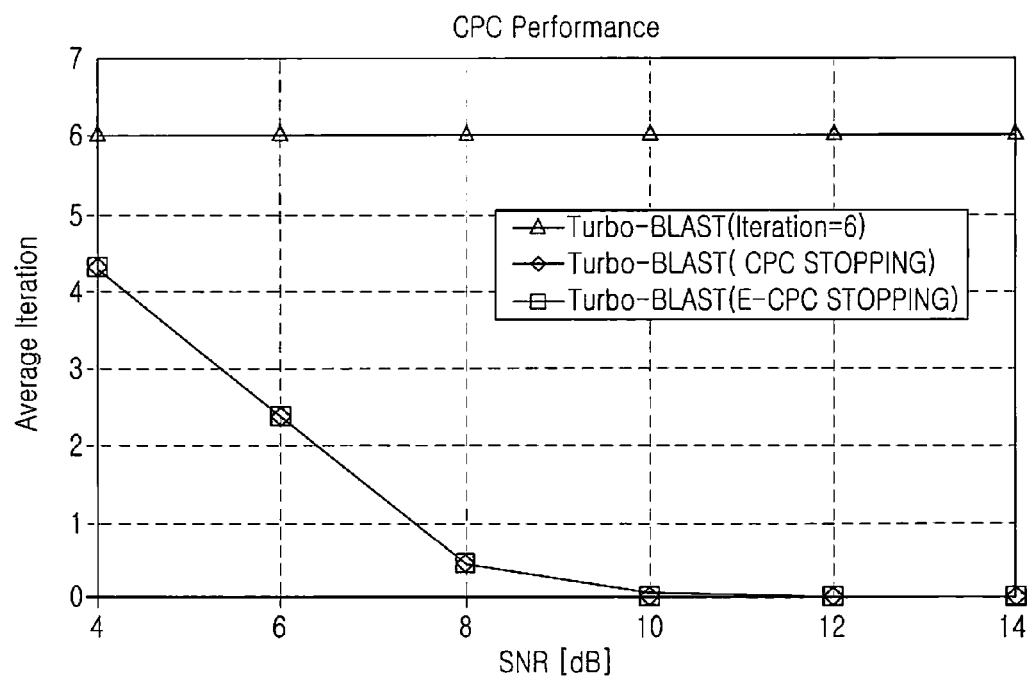

FIGS. 8 and 9 are diagrams illustrating CPC performance in a Turbo-BLAST MIMO system environment that uses a MMSE detector as a MIMO detector for a Veh.A 60 km/h channel, Quadrature Phase Shift Keying (QPSK), and a code rate ½ in a WiBro system.

As for 1% PER, the average number of iterations of Turbo-BLAST has reduced to 0.3, and the E-CPC stopping technique, even though the number of turbo coding is halved, shows the same performance as that of the CPC stopping technique.

As is apparent from the foregoing description, according to the present invention, the Turbo-BLAST MIMO system can early stop iterative detection and decoding with use of the CPC stopping technique and the E-CPC technique, thereby noticeably reducing the average number of iterations of Turbo-BLAST with the same performance, compared to the case where the stopping technique is not used. In this manner, the present invention can contribute to a reduction in the complexity of the Turbo-BLAST MIMO system and an increase in the processing speed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing Forward Error Correction (FEC) in a Multiple-Input Multiple-Output (MIMO) communication system using a Turbo-Bell Labs Layered Space-Time (BLAST) scheme, the method comprising:
    performing soft decision on a frame received via a plurality of antennas;
    performing iterative decoding on a soft decision result value a predetermined number of times, and outputting Log Likelihood Ratio (LLR) values for information bits and first parity bits constituting the frame;
    generating second parity bits by coding information bits calculated from the LLR values, and comparing the first parity bits calculated from the LLR values with the coded second parity bits; and
    if the first parity bits are identical to the second parity bits, outputting the information bits, determining that there is no error, and if the first parity bits are not identical to the second parity bits, feeding back the LLR values as a-priori information of the soft decision, and returning to the performing of soft decision.

2. The method of claim 1, wherein the returning to the performing of soft decision is performed a predetermined maximum number of times, and when a current number of iterations exceeds the maximum number of times, the information bits are output.

3. The method of claim 1, wherein the performing of iterative decoding comprises performing first and second decoding using a Maximum A Posteriori (MAP) algorithm;
    wherein the coding of information bits comprises setting, as an initial state value, a maximum value among first backward metric probability values being output after the first and second decoding, and performing code coding for the information bits using the initial state value.

4. An apparatus for performing Forward Error Correction (FEC) in a Multiple-Input Multiple-Output (MIMO) communication system using a Turbo-Bell Labs Layered Space-Time (BLAST) scheme, the apparatus comprising:
    a detector for performing soft decision on a frame received via a plurality of antennas;
    a decoder for performing iterative decoding on a soft decision result value a predetermined number of times, and outputting Log Likelihood Ratio (LLR) values for information bits and first parity bits constituting the frame; and
    a coder for generating second parity bits by coding information bits calculated from the LLR values, comparing the first parity bits calculated from the LLR values with the coded second parity bits, determining an error occurs according to the comparison result, and outputting the information bits or feeding back the LLR values as a-priori information of the soft decision according to a determination result.

5. The apparatus of claim 4, wherein if the first parity bits are identical to the second parity bits, the coder outputs the information bits, determining that there is no error, and if the first parity bits are not identical to the second parity bits, the coder feeds back the LLR values as a-priori information of the soft decision.

6. The apparatus of claim 5, wherein the coder feeds back the LLR values a predetermined maximum number of times, and when a current number of iterations exceeds the maximum number of times, the coder outputs the information bits without feeding back the LLR values.

7. The apparatus of claim 4, wherein the decoder comprises a first Maximum A Posteriori (MAP) unit and a second MAP unit for performing first and second decoding using a MAP algorithm, respectively, the first MAP unit and the second MAP unit being cascaded;

wherein the coder sets as an initial state value a maximum value among first backward metric probability values output the first MAP unit and the second MAP unit, and performs code coding for the information bits using the initial state value.

* * * * *